April 8, 1969 R. J. O'NEILL 3,437,210
RECIPROCATING BELT FILTER
Filed Jan. 25, 1967 Sheet 1 of 2
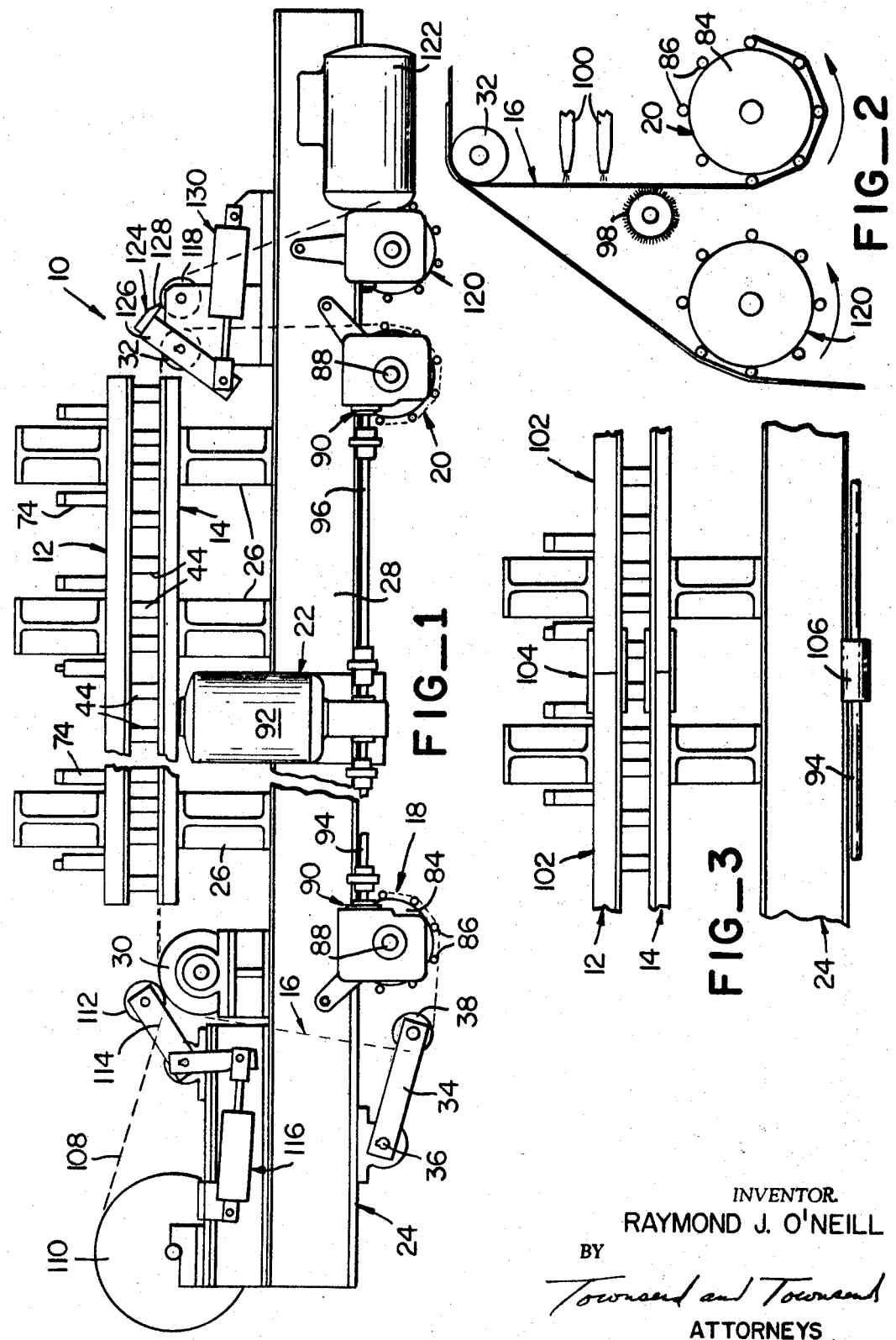
INVENTOR.
RAYMOND J. O'NEILL
BY
Townsend and Townsend
ATTORNEYS

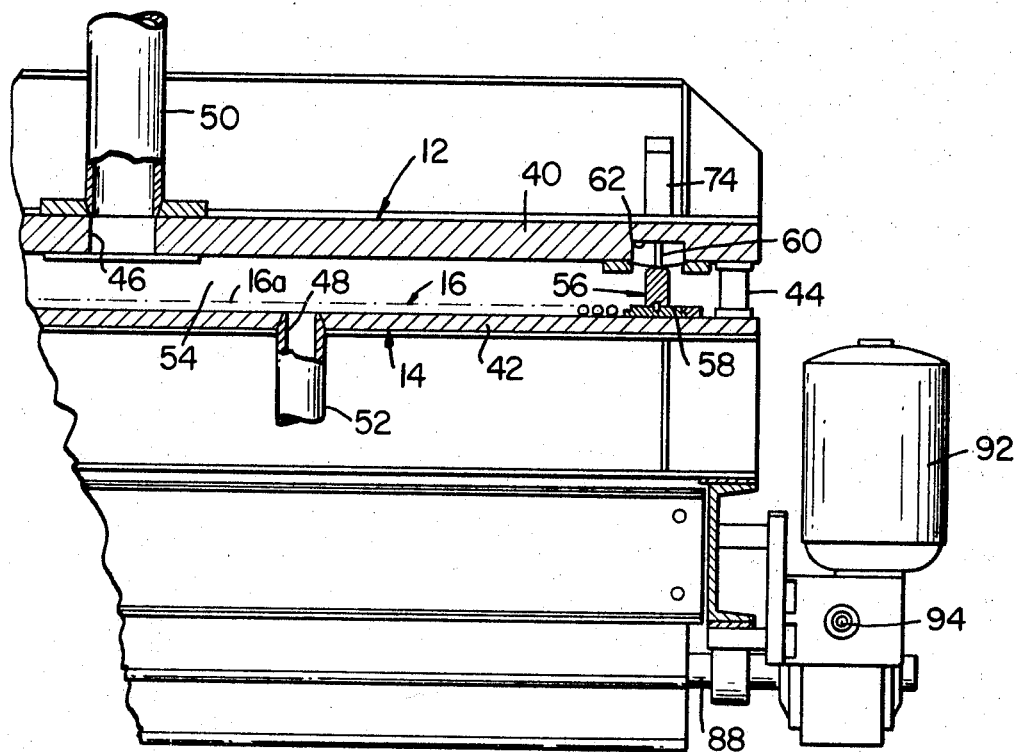
FIG_4
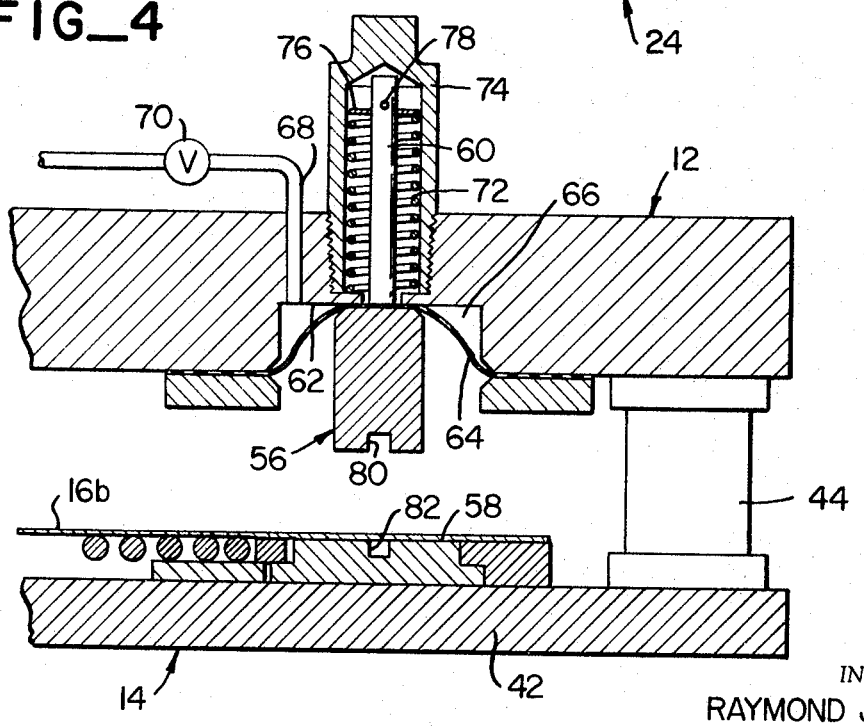
FIG_5
INVENTOR.
RAYMOND J. O'NEILL
BY
Townsend and Townsend
ATTORNEYS

United States Patent Office 3,437,210
Patented Apr. 8, 1969

3,437,210
RECIPROCATING BELT FILTER
Raymond J. O'Neill, Alameda, Calif., assignor to De Laval Turbine Inc., Milbrae, Calif.
Filed Jan. 25, 1967, Ser. No. 611,739
Int. Cl. B01d 33/00
U.S. Cl. 210—387                              8 Claims

ABSTRACT OF THE DISCLOSURE

A filter having an elongated filter member disposed between a pair of separable fluid conductors and connected at its ends to a pair of rotatable drums so that the filter member can move in opposed directions when the conductors are separated and when the drums are alternately rotated. A cleaning structure is positioned to clean the filter member as it moves relative to the conductors and a second, disposable filter member can be utilized with the first filter member wherein the latter acts also as a carrier for the second filter member.

---

This invention relates to improvements in filter devices and, more particularly, to filter apparatus of the type having a movable filter between a pair of separable fluid conductors.

The present invention is directed to the use of an elongated, flexible filter member which is secured at its ends to a pair of spaced, rotatable drums and which extends between a pair of relatively shiftable, separable fluid conductors to filter a fluid flowing therethrough when the conductors are together. The filter member has a length sufficient to permit it to be partially wrapped on both drums and is moved in one direction and then reversed by first rotating the drums in one sense and then rotating the drums in the opposite sense. Thus, the filter member is wrapped onto one drum as it is unwrapped from the other drum. When the conductors are separated, the filter member is free to move relative thereto and, at that time, the drums may be rotated to advance the filter member in a desired direction and through a predetermined distance for cleaning purposes. After being cleaned, the filter member may be reversed and thereby returned to its normal operative position between the conductors. The filtering action can be continued after the conductors have been moved together once again.

An important feature of the invention is the way in which the filter member is cleaned. To this end, cleaning structure is disposed adjacent to the path of travel of the filter member so that it can be cleaned not only as it moves in a direction out of the conductors but also as it moves in reverse back into the conductors. Thus, the cleaning time is effectively doubled.

Another feature of the invention is that a second, disposable filter member may be combined with the first filter member to provide a desired filtration rate. To this end, the first filter member acts also as a carrier for the second filter member, the latter being preferably in the form of a roll adjacent to the filter inlet side of the fluid conductors. The filter members move together when the first filter member is moved out of the conductors for cleaning. When this occurs, a used stretch of the second filter member moves out of the conductors and is replaced by a clean stretch. When the first filter member is reversed, the second filter member is held against movements by suitable stop means. Thus, the clean stretch remains in the conductors and in a position for filtering of fluid after the conductors are once again moved together.

Reusable filters have been used in the past between a pair of separable fluid conductors. However, these filters have generally been of the endless belt type which are driven at their side edges by conveyors chains or by drive sprockets. The filter itself is disposed so that it has an upper stretch and a lower stretch, the upper stretch normally being used for filtering while the lower stretch remains in a standby condition for replacing the upper stretch as the filter. The lower stretch is usually cleaned while the upper stretch is filtering a fluid passing through the conductors.

One disadvantage of the endless type of filter is that the lower stretch thereof precludes a conduit from extending downwardly from the lower conductor. The lower stretch therefore interferes with the fluid flow line of which the conductors form a part. Provision must, therefore, be made to divert the fluid flow laterally of the filter so that it will avoid the lower stretch. This requires additional conduit structure and congests the area in and around the endless filter. The present filter apparatus, on the other hand, avoids this problem by utilizing an elongated filter member whose ends are connected to the rotatable drums adjacent to the sides of the conductors. This construction clearly eliminates any portion of the filter member below the lower conductor and allows straight-down discharge of fluid therefrom.

Another disadvantage of an endless filter is that there is no uniform pull across the filter when it is moved. This is because an endless filter is driven at its side edges such as by a chain or by a chain of sprockets. This oftentimes results in wrinkling of the central portion of the filter and, when the conductors are moved together with the filter therebetween, a bad seal is formed between the filter and the conductors. Moreover, the non-uniform pull on the endless filter tends to weaken it so as to shorten its operating life. This problem is overcome by the use of the present invention wherein the single length of the filter is secured at its ends to a pair of rotatable drums and the wrapping and unwrapping of the filter on the drums causes a uniform pull to be exerted on the filter itself, regardless of its direction of movement.

The present filter member can also be cleaned twice during a rejuvenation operation so as to assure that the filter member will be placed once again in the proper condition for filtering a fluid passing through the conductors. The filter member is first cleaned as it is removed from the filtering zone between the conductors and it is cleaned a second time as it is returned to the filtering zone preceding the next filtering operation. The movement of the filter member is effected by rotating the drums through a predetermined number of revolutions so that the usable portion of the filter member can be moved through a distance sufficient to assure that it will be completely exposed to the cleaning equipment provided for this purpose. This equipment is disposed so that it will clean both sides of the filter member during movement.

The foregoing advantage is not attainable with the use of an endless filter because only one side of the filter can be conveniently cleaned. To clean both sides, additional cleaning equipment would have to be placed within the loop of the endless filter and such placement would, in all likelihood, interfere with the conduit extending downwardly and laterally from the lower conductor, as well as further congest the area in and around the filter. Also, twice as much cleaning equipment would be required to do the same job as is capable when the present filter member is utilized. This is because the endless filter moves only in one direction. Moreover, the present filter member is not subjected to drying or caking of the material filtered from a fluid. Such material is immediately removed by the aforesaid cleaning operation as soon as the filter is advanced following the separation of the conductors. The filter is also cleaned before it is wrapped onto one of the drums and is further cleaned as it is unwrapped from this drum and returned to the filtering zone.

An endless filter must be replaced when it becomes worn and it has the added disadvantage of requiring a splice for interconnecting the ends of the material forming the filter. Since the splice is a mechanical connection, the endless filter must be positioned so that the splice is not in the filtering zone or that the splice provides the same filtration rate as the remainder of the filter. The present filter, on the other hand, can be reversed when it is worn, since it has at least two stretches, only one of which is in use at any one time. The other stretch merely serves to connect the stretch in use to one of the drums. Thus, the filter member can have double the operating life of only a single stretch. Also, the present filter member needs no splice as its ends are connected directly to the rotatable drums.

The drive structures of certain of the endless type filters extend through the filtering zone and thus are subjected to the corrosive and other deleterious effects of the fluid to be filtered. This is oftentimes deemed necessary to minimize the wrinkling of the filter as described above. By placing the rotatable drums of the present filter apparatus externally of the conductors, only the filter member itself is contacted by the fluid to be filtered and corrosion problems are clearly circumvented.

It is, therefore, the primary object of this invention to provide an improved filter of the type utilizing a pair of separable fluid conductors and a filter movably disposed between the conductors and capable of being rejuvenated wherein the filter extends laterally from the conductors and has a pair of ends which are secured to reversible drive structures so that a usable stretch of the filter member can be removed from the filtering zone between the conductors, cleaned at a location externally of the conductors, and then returned to the filtering zone when the conductors are separated. Thus, the filter can be rejuvenated and, when the conductors are moved together, will be again in a condition for filtering a fluid passing through the conductors.

Another object of the present invention is to provide filter apparatus of the type described wherein the filter can not only be cleaned on both sides of the usable stretch thereof, but also can be cleaned as it moves out of and away from the filtering zone and is returned to this zone to thereby assure that the filter will be in the proper condition for filtering a fluid passing through the conductors.

A second filter member can be utilized with the first mentioned filter member where a predetermined filtration rate is desired. To this end, the second member is disposed on and carried by the first filter member as the latter moves in a direction to advance the used portion thereof out of the filtering zone between the conductors. The second filter member is intended to be disposable so that a clean portion thereof is moved into the filtering zone as the used portion thereof is moved out of the zone. Stop means is provided to hold the second member against movement as the first filter member is reversed and returned to the filtering zone. The first filter member can, therefore, be cleaned in the above-described manner, notwithstanding the presence of the second filter member.

It is thus another object of the present invention to provide filter apparatus of the aforesaid character wherein a second, disposable filter member can be utilized with the first filter member to attain a desired filtration rate and wherein the second filter member can be advanced by the first member as the latter moves through its cleaning cycle so that, not only is the first member cleaned in the manner described, but also a clean portion of the second filter member can move into the filtering zone while a used portion will be moved out of the zone.

Other objects of the invention will become apparent as the following specification progresses, reference being had to the accompanying drawings for an explanation of a preferred embodiment of the apparatus.

In the drawings:

FIG. 1 is a side elevational view of the apparatus, showing both the first and second filter members in cooperation with a pair of shiftable fluid conductors;

FIG. 2 is a fragmentary side elevational view of the apparatus, showing the cleaning structure therefor;

FIG. 3 is a fragmentary side elevational view of the apparatus as it is formed of several conductor sections;

FIG. 4 is a fragmentary cross-sectional view of the apparatus looking in the direction of movement of the filter members between the conductors; and FIG. 5 is an enlarged, fragmentary, cross-sectional view of the fluid conductors.

A preferred embodiment of the filter apparatus is shown in FIG. 1 and is denoted by the numeral 10. Apparatus 10 includes an upper fluid conductor 12 and a lower fluid conductor 14, an elongated filter member 16, a pair of drums 18 and 20 to which the ends of the filter member are attached, and drive means 22 for alternately rotating the drums in opposed directions. The conductors and the drums are mounted on a base support 24, including a number of cross beams 26 on which the lower conductor 14 rests. Beams 26 are supported by at least a pair of longitudinally extending beams 28, only one of which is shown in FIGS. 1 and 4.

The fluid conductors are relatively shiftable so that they close and open a filtering zone therebetween as they move toward and away from each other. Filter member 16 extends through this filtering zone and projects outwardly from opposed sides of the conductors. The filter member engages rollers 30 and 32 and extends downwardly therefrom toward respective drums. Between roller 30 and drum 18, however, the filter member is tensioned by an arm 34 mounted by means of a pin 36 on support 24 for rotation about a horizontal axis. A roller 38 on arm 34 bears against and is supported by the filter member so as to provide a predetermined tension therefor.

The ends of filter member 16 are secured in a suitable manner to drums 18 and 20. These connections are made so as to assure that the filter member will be uniformly wrapped on each drum when the drum is rotated in the proper direction to effect this action.

Fluid conductors 12 and 14 can be of any desired construction so long as they are capable of moving toward and away from each other and, when they move together, they close the filtering zone in which filter member 16 is disposed. For purposes of illustration, conductors 12 and 14 include a pair of upper and lower stationary plates 40 and 42, respectively (FIGS. 4 and 5) which are held in spaced relationship by a number of spacers 44. Plate 40 has an opening 46 defining a fluid inlet and plate 42 has an opening 48 defining a fluid outlet. Conduits 50 and 52 are aligned with these openings, conduit 50 adapted to be coupled to a source of fluid and conduit 52 being adapted for connection to a fluid receiver.

The filtering zone 54 between plates 40 and 42 is closed by a continuous, polygonal frame 56 shiftably carried on plate 40 for movement toward and away from a continuous, polygonal surface 58 formed in any suitable manner on the upper face of plate 42. Frame 56 has a number of rods 60 extending upwardly therefrom and into and through a continuous recess 62 formed in the lower face of plate 40. Recess 62 is closed by flexible diaphragm 64 secured to the upper extremity of frame 56 so that the recess defines an expansion chamber 66. A conduit 68 communicates with chamber 66 and is adapted to be coupled to a source of fluid under pressure, such as a pressurized air source. A three-way valve 70 is provided to control the fluid flow to and from chamber 66.

When frame 56 is in the position thereof shown in FIG. 4, it forces filter member 16 against surface 58 and closes filtering zone 54. This occurs when chamber 66 is pressurized to cause inflation of diaphragm 64 so that it assumes the operative position of FIG. 4.

When chamber 66 is exhausted to the atmosphere through valve 70, a number of springs 72 disposed about respective rods 60 bias frame 56 away from surface 58 in the manner shown in FIG. 5. The rods and springs are housed in closed end tubes 74 threadably or otherwise coupled to plate 40. The springs are normally under compression and bear against an annulus 76 surrounding each rod 60 and disposed beneath a pin 78 extending through the rod.

Although frame 56, when it forces the filter member against surface 58 provides an adequate seal at this location, it may be necessary or desirable to provide additional sealing means to offset the tendency for the fluid to leak because of the porosity of the filter member. To this end, frame 56 has a continuous groove 80 in its lower face, and surface 58 has a continuous groove 82 which mates with groove 80 when frame 56 is in the down position as shown in FIG. 4. Grooves 80 and 82 may be connected to a source of fluid under pressure or may be connected to a vacuum source. If connected to a pressurized fluid source, the pressurized fluid forces the fluid to be filtered back into the filtering zone, should there be any tendency for the filtered fluid to leak past frame 56. This might occur if the filtered fluid is under a predetermined pressure. On the other hand, if a vacuum source is used, any leakage fluid will be drawn into grooves 80 and 82 and directed to a receiver and, possibly, be returned to the source coupled to conduit 50.

Filter member 16 will generally have a length sufficient to permit the usable portion 16a thereof to be completely removed from the filtering zone and cleaned, and then returned to the filtering zone. To this end, the filter member has a second portion 16b which moves into the filtering zone as the first portion 16a moves out of this zone. Since the drums are spaced a certain distance from the inlet and outlet ends of the filtering zone, the filter member itself will have a length more than twice the length of filtering zone 54. Also, the cleaning equipment will be spaced a certain distance from the outlet end of the filtering zone so that this will increase the requisite length of filter member 16.

When portion 16a is in its normal operative position in filtering zone 54, portion 16b will at least be partially wrapped on drum 18. Thus, as portion 16a moves out of the filtering zone following the separation of frame 56 from surface 58, portion 16b will automatically move into the filtering zone. Portion 16a will then be at least partially wrapped onto drum 20. Reversing this movement will return portion 16b to at least partially wrapped relationship on drum 18 and portion 16a will return to filtering zone 54.

Each of drums 18 and 20 includes a pair of spaced, circular end walls 84 interconnected by circumferentially spaced rods 86. A shaft 88 extends through end walls 84 and is mounted on support 24 for rotation in opposed directions about a horizontal axis. Gear means 90 interconnects shaft 88 to a reversible motor 92. To this end, a link 94 interconnects gear means 90 corresponding to drum 18 to motor 92 and a link 96 connects gear means 90 corresponding to drum 20 to motor 92. The motor is suitably controlled so that it rotates drum 20 when filter member 16 is to be rejuvenated, i.e., when portion 16a is to be cleaned. Conversely, the motor is operated to rotate drum 18 when portion 16a is to be returned to filtering zone 54. Motor 92 and links 94 and 96 form parts of drive means 22.

FIG. 2 illustrates the cleaning means for portion 16a. To this end, a rotary brush 98 is mounted to brush the normally uppermost surface of portion 16a and a pair of nozzles 100 are disposed adjacent to the opposite surface of the filter member to direct a fluid under pressure in a direction to force the solids or precipitate accumulated on the uppermost surface of the filter member away from the latter. Other cleaning components could be used if desired, those shown in FIG. 2 being illustrative only. The cleaning components are carried on support 24 in any suitable manner and suitable collection means is provided to receive the solids removed from the filter member.

Rods 86 on drums 18 and 20 are transversely circular so as to present convex outer, cover engaging surfaces. The purpose of this feature is to minimize the contact between the rods and the filter member and also the contact between different layers of portion 16a wrapped on drum 20. If the cleaning step as portion 16a moves onto drum 20 is not completely effective, some of the remaining solids may be transferred from one layer to another. To minimize this, the rods are spaced apart so that the portions of the layers between adjacent rods are substantially parallel, as shown in FIG. 2.

FIG. 3 illustrates how conductor sections can be interconnected to increase the filtering capacity of apparatus 10. Each of the conductors 12 and 14 comprises a unit 102 and a number of units 102 can be interconnected in end-to-end relationship in the manner shown in FIG. 3 by the use of a coupling 104 between each pair of units 102 respectively. The length of filter member 16 is required to be increased to accommodate additional units 102. Moreover, extensions will be required on links 94 and 96, although the same drums 18 and 20 can be utilized regardless of the number of units 102. To this end, a coupling element 106 interconnects a pair of link sections which define link 94.

*Operation*

To use filter member 16 for filtering a fluid passing through conductors 12 and 14, its ends are secured to drums 18 and 20 and then disposed so that it is at least partially wrapped about the drums. Conduit 50 is adapted to be coupled to a source of fluid and this source may be pressurized. Conduit 52 will be connected to a fluid receiver and it is to be noted that conduit 52 can extend straight downwardly from conductor 14, since there will be not other structure below this conductor except for beams 26. Conduit 68 will be connected to a source of fluid under pressure and, if used, grooves 80 and 82 will be connected to a suitable pressurized source or to a vacuum source.

With portion 16a in filtering zone 54 and with frame 56 elevated in the manner shown in FIG. 5, valve 70 is actuated so that fluid under pressure may be directed into expansion chamber 66. When this occurs, diaphragm 64 is inflated and it forces frame 56 downwardly and presses the marginal edge extremity of filter member 16 against surface 58. Thus, filtering zone 54 is closed and flow of fluid into this zone may commence. Suitable valve structure is provided to control this fluid flow.

As the fluid passes through conductors 12 and 14, it is filtered by portion 16a, the filtered solids remaining on the uppermost surface of portion 16a. After a predetermined time interval has elapsed, the filtering operation will be interrupted so that portion 16a can be cleaned. At this time, the fluid flow through the conductors is halted and chamber 66 is exhausted to the atmosphere so that springs 72 will lift frame 56 from surface 58. When this occurs, filter member 16 is free to move relative to conductors 12 and 14.

Motor 92 is then actuated to rotate drum 20 in a clockwise sense when viewing FIG. 1. Portion 16a is then moved out of filtering zone 54 and past nozzles 100 and brush 98. These components clean portion 16a as it moves onto drum 20.

After the filter member has been moved through a distance sufficient to subject portion 16a to the cleaning components, motor 92 is reversed and this causes drum 18 to rotate in a counterclockwise sense when viewing FIG. 1. This moves the filter member in reverse and portion 16a moves past the cleaning components once again as it returns to filtering zone 54. Thus, this portion is cleaned two times so that it will be in the proper condition to provide a predetermined filtration rate after it is once again returned to zone 54.

This cycle can be repeated over and over again and can even be made automatic if desired.

Filter member 16 can be of any suitable construction so as to give a certain filtration rate when portion 16a is in zone 54. When portion 16a becomes worn or otherwise is deemed not to be further usable, filter member 16 can be reversed so that portion 16b now is the usable portion of the filter member. All that is required is that the ends of the filter member be reversed so that they become connected to the opposite drums as that illustrated. Thus, the end connected to drum 18 will become connected to drum 20 and vice versa. This feature allows the filter member to have double the operating life of portion 16a.

The absence of a lowermost stretch, such as occurs with an endless carrier, allows the filtered fluid to pass straight downwardly from conductor 14. This eliminates additional conduits and minimizes the congestion in and around the area beneath conductor 14.

To assure that the filter member is properly wrapped and unwrapped from drums 18 and 20, both drums can operate together. Thus, both of the drums rotate in a clockwise sense when viewing FIG. 1 when a cleaning cycle is started and the drums rotate in the opposite direction together when the usable portion of the filter member is to be returned to zone 54.

It may be desirable to provide a second filter member 108 with filter member 16 so as to obtain still another filtration rate not obtainable with filter member 16 alone. To this end, filter member 108 extends through zone 54 and is in juxtaposition to and above filter member 16. Filter member 108 is preferably supplied in the form of a roll 110 mounted on support 24 adjacent to the inlet side of zone 54. A roll 112 carried by a pivotally mounted arm 114 forces filter member 108 toward roller 30 so that both filter members will enter the filtering zone in the proper manner. A fluid actuated piston and cylinder assembly 116 are coupled to arm 114 and are disposed to cause roller 112 to bear against filter member 108 with a predetermined pressure.

At the exit end of filtering zone 54, filter member 108 passes over and downwardly from a roller 118 and can be at least partially wrapped about a drum 120 similar in all respects to drums 18 and 20. A motor 122 rotates drum 120 in accordance with the speed of movement of filter member 108 out of zone 54.

Filter member 108 is intended to be disposable so that after it passes drum 120 it may be properly disposed of. When member 108 is used, filter member 16 serves both as a filter and as a carrier for member 108. Any solids that pass through filter member 108 will, in all likelihood, be trapped by filter member 16 and the latter will be cleaned in the usual manner.

Stop means 124 is provided for member 108 to prevent reverse movement of the latter as filter member 16 is reversed. Means 124 includes an arm 126 pivotally mounted intermediate its ends on support 24 and having a bar 128 which is inclined and serves to prevent retrograde movement of filter member 108. A fluid piston and cylinder assembly 130 coupled to arm 126 biases the latter in a clockwise sense when viewing FIG. 1.

In operation, filter member 16 will, of course, be coupled at its ends to drum 18 and drum 20. Filter member 108 will be manually fed through filtering zone 54 and extend at least partially outwardly therefrom and about roller 118. Filtering zone 54 will be closed by causing frame 56 to be lowered upon inflation of diaphragm 64. The flow of fluid through the conductors may then commence, whereupon filter member 108 will be the prime filter for the fluid.

The filter rejuvenation cycle is commenced by stopping the fluid flow through the conductors, exhausting chamber 66 to the atmosphere and actuating motor 92, and possibly motor 122 if member 108 is operably coupled to drum 120. Nonetheless, filter member 108 will adhere to filter member 116 because both are permeated with the fluid to be filtered and are in juxtaposition with each other so as to give rise to adhesion forces. Thus, the filter members move together during the first part of the cleaning cycle.

After portion 16a has been moved out of zone 54 and cleaned, motor 92 is reversed to move filter member 16 in the opposite direction. However, stop means 124 operates to prevent reverse movement of filter member 108 so that filter member 116 moves relative to filter member 108 until portion 16a is returned to zone 54.

It is to be noted that a clean stretch of filter 108 moves into zone 54 as a used stretch moves out of the zone. Thus, the clean stretch is already in the zone as portion 16a returns thereto following the completion of the cleaning cycle. The filtering operation can then be continued upon closing of zone 54 by once again inflating diaphragm 64 and moving frame 56 downwardly to the position shown in FIG. 4.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. Filter apparatus comprising: a pair of separable fluid conductors adapted to be coupled to a fluid flow line for passing a fluid when the conductors are together; means coupled with one of the conductors for moving the same toward and away from the other conductor, whereby the conductors can be moved together or be separated from each other; an elongated, flexible filter member having a usable portion normally disposed in an operative position between said conductors and a pair of end portions projecting laterally from opposed sides thereof, said usable portion of the filter member being clamped between said conductors and disposed to filter a fluid passing through the conductors when the latter are together; a rotatable drum for each end portion of the filter member respectively, the drums being adjacent to respective sides of said conductors, said filter member being secured at its end portions to respective drums and having a length sufficient to permit said usable portion to be moved out of and then returned to said operative position when said conductors are separated; means adjacent to the filter member for cleaning the usable portion thereof as it moves relative to the conductors; and means coupled with the drums for alternately rotating the same in respective, opposed directions, whereby the filter member may be wrapped onto one drum and unwrapped from the other drum when said one drum is rotated in one direction and may be wrapped onto the other drum and unwrapped from said one drum when said other drum is rotated in the opposite direction.

2. Filter apparatus as set forth in claim 1, wherein said rotating means includes a reversible motor and means connecting the motor to the drums to cause the latter to rotate simultaneously in the same direction.

3. Filter apparatus as set forth in claim 1, wherein is provided a second filter member disposed between said conductors and normally in juxtaposition with said first filter member, said filter members being movable together in one direction, and including means coupled with said second filter member for maintaining the same in a fixed position relative to said conductors when said first filter member moves in the opposite direction.

4. Filter apparatus as set forth in claim 3, wherein is provided a rotatable roll adjacent to said conductors, said second filter member being in wrapped relationship on said roll and being unwrapped therefrom when the filter members move in said one direction.

5. Filter apparatus as set forth in claim 1, wherein each drum is comprised of a pair of spaced end walls and a plurality of spaced rods spanning the distance between and connected to said end walls, each rod having a convex, filter member-engaging surface.

6. Filter apparatus as set forth in claim 1, wherein said conductors define a filtering space when the same are together, said filter member being in said space and having a length equal to at least twice the length of the space and a width equal to at least the width of the space.

7. In filter apparatus a pair of relatively shiftable fluid conductors adjacent to each other and defining a filter-receiving space therebetween, said conductors adapted to be coupled to a fluid flow line; means coupled with said conductors for moving the same toward and away from each other and thereby into and out of closing relationship to said space; an elongated, flexible filter member extending through the space when the latter is closed, said filter member having end portions extending outwardly from the conductors in opposed directions; a pair of actuatable drives on opposed sides of said conductors, there being a drive for each end portion of the filter meber respectively, said drives being mounted adjacent to and externally of said conductors and disposed in alignment with said filter member, the end portions of the filter member being secured to respective drives and the length of the filter member being greater than the corresponding dimension of said space to permit the usable portion to be moved out of and then returned to said space when the latter is open; and means coupled with said drives for actuating the same to cause said usable portion to alternatively move out of and then return to said space after said conductors have been moved away from each other.

8. Apparatus for filtering a fluid passing through a fluid flow line comprising: a pair of relatively shiftable fluid conductors disposed to define a filter-receiving space therebetween, said conductors being movable toward and away from each other and thereby into and out of closing relationship to said space, one of the conductors having a fluid inlet and the other conductor having a fluid outlet, the inlet and the outlet adapted to be coupled to a fluid flow line for passing a fluid along a path through said space when the latter is closed; means coupled with said conductors for moving the same toward and away from each other; a flexible sheet member of filter material disposed in said space in intersecting relationship to said path and extending outwardly from opposed sides of the conductors, said sheet member adapted to be clamped in a fixed location with respect to said space for filtering a fluid flowing therethrough when the space is closed; a pair of drums, there being a drum for each end of the sheet member respectively; means mounting the drums adjacent to respective sides of the conductors for rotation relative thereto about axes substantially perpendicular to said path and to the longitudinal axis of the sheet member, each of said drums including a pair of spaced end walls and a plurality of rods interconnecting the end walls, the rods having convex, outermost surfaces, the ends of the sheet member being connected to the respective drums and the length of the sheet member being sufficient to permit it to be partially wrapped on both of said drums at the same time, said sheet member being movable in opposed directions and onto and off said drums when said space is open; a reversible motor; means coupling the motor to the drums for rotating a first of said drums to cause the sheet member to move in one direction through the space and for rotating the other drum to cause the sheet member to move in the opposite direction through the space; and means adjacent to one of the drums for cleaning the filter member as it moves toward said one drum.

References Cited

UNITED STATES PATENTS

| 453,815 | 6/1891 | Martin | 210—401 |
| 1,953,289 | 4/1934 | Cohen | 210—387 |
| 2,901,626 | 8/1959 | Becker | 55—290 X |
| 3,335,862 | 8/1967 | Hirs | 210—387 X |

REUBEN FRIEDMAN, *Primary Examiner.*

J. ADEE, *Assistant Examiner.*

U.S. Cl. X.R.

210—393